US010288162B2

United States Patent
Terwart et al.

(10) Patent No.: US 10,288,162 B2
(45) Date of Patent: May 14, 2019

(54) CONTROL METHOD FOR A TRANSMISSION WITH HYDRAULIC SYSTEM COMPRISING A VARIABLE DISPLACEMENT PUMP

(71) Applicant: ZF Friedrichshafen AG, Friedrichshafen (DE)

(72) Inventors: Markus Terwart, Thundorf (DE); Rainer Novak, Bregenz (AT); Dirk Friederich, Daisendorf (DE); Lukas Spath, Schonungen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/667,840

(22) Filed: Aug. 3, 2017

(65) Prior Publication Data
US 2018/0051795 A1    Feb. 22, 2018

(30) Foreign Application Priority Data
Aug. 16, 2016  (DE) .................... 10 2016 215 225

(51) Int. Cl.
*F16H 57/04*  (2010.01)
*F16H 61/00*  (2006.01)

(52) U.S. Cl.
CPC ..... *F16H 57/0446* (2013.01); *F16H 57/0413* (2013.01); *F16H 57/0417* (2013.01);
(Continued)

(58) Field of Classification Search
None
See application file for complete search history.

(56) References Cited

U.S. PATENT DOCUMENTS 8,182,238 B2 *  5/2012  Frait ................... F16H 61/0021
                                                          417/220
9,309,792 B2 *  4/2016  Long ....................... F16H 61/42
(Continued)

FOREIGN PATENT DOCUMENTS

DE    102009039776 A1    3/2011
DE    102013201266 A1    7/2014
(Continued)

OTHER PUBLICATIONS

German Search Report DE102016215225.4, dated Mar. 9, 2017. (8 pages).

*Primary Examiner* — Dirk Wright
(74) *Attorney, Agent, or Firm* — Dority & Manning, P.A.

(57) ABSTRACT

A method for operating a transmission (3) with a hydraulic system comprising a variable capacity hydraulic pump, the method comprising determining during operation, a current hydraulic fluid volume requirement for actuating the transmission (3) and for temperature controlling and lubricating components of the transmission (3); setting the delivery volume of the hydraulic pump in a manner dependent on the currently determined hydraulic fluid volume requirement of the transmission (3), the delivery volume of the hydraulic pump, provided for temperature controlling and lubricating the components, being guided at least partially through a heat exchanger; wherein the delivery volume of the hydraulic pump is varied in a manner dependent on a temperature of the hydraulic fluid to an extent which sets that part of the delivery volume flow of the hydraulic pump which is to be guided via the heat exchanger.

7 Claims, 3 Drawing Sheets

(52) U.S. Cl.
CPC ..... *F16H 57/0436* (2013.01); *F16H 61/0025* (2013.01); *F16H 2061/0037* (2013.01)

(56) References Cited

U.S. PATENT DOCUMENTS

| | | | |
|---|---|---|---|
| 9,477,231 B2* | 10/2016 | Miyata | F04B 49/02 |
| 9,500,277 B2* | 11/2016 | Jo | F16H 61/0025 |
| 9,739,374 B2* | 8/2017 | Kanehara | F16H 61/0021 |
| 9,803,637 B2* | 10/2017 | Kinch | F04C 2/3442 |
| 9,903,468 B2* | 2/2018 | Hwang | F16K 15/00 |
| 2015/0030472 A1* | 1/2015 | Wi | F16H 61/0025 |
| | | | 417/286 |
| 2015/0330375 A1* | 11/2015 | Mizuno | F04B 17/04 |
| | | | 417/415 |

FOREIGN PATENT DOCUMENTS

| | | |
|---|---|---|
| DE | 102014207798 A1 | 10/2015 |
| DE | 102014224820 A1 | 6/2016 |
| WO | WO 2015/041589 A1 | 3/2015 |

* cited by examiner

CONTROL METHOD FOR A TRANSMISSION WITH HYDRAULIC SYSTEM COMPRISING A VARIABLE DISPLACEMENT PUMP

FIELD OF THE INVENTION

The invention relates generally to a method for operating a transmission with a hydraulic system which includes a variable displacement hydraulic pump.

BACKGROUND

Automatic transmissions known from practice are often configured with what is known as a fixed displacement pump for hydraulic supply, the delivery volume of which fixed displacement pump is proportional to an input speed. This means that the delivery volume of the fixed displacement pumps increases continuously as the input speed rises. Here, the fixed displacement pumps are usually operatively connected via a transmission input shaft to a drive machine of a vehicle drive train, and are therefore driven proportionally with respect to the input speed of the drive machine.

In order to avoid undersupplied operating states of the transmission over the entire operating range of a transmission, at least in the range of the transmission actuator system, the delivery capacity of fixed displacement pumps is designed in each case for that operating point of the transmission at which the maximum hydraulic fluid volume requirement is requested by the transmission actuator system and, at the same time, the hydraulic pump is driven by the drive machine at the minimum input speed which, in the case of a configuration of the drive machine as an internal combustion engine, corresponds to its idle rotational speed.

Said design criterion disadvantageously leads to the pump delivering considerably more hydraulic fluid volume than is necessary for the supply of an automatic transmission in operating states of the vehicle drive train in which the drive machine is operated in speed ranges above the idle rotational speed. This circumstance undesirably impairs an efficiency of the transmission, which is ultimately reflected in an increased fuel consumption of the drive machine.

In order to improve an efficiency of an automatic transmission, automatic transmissions are increasingly equipped with variable capacity hydraulic pumps, the delivery volumes of which are variable in a regulated manner independently of the input speed. By way of controllable variable capacity pumps of this type, there is now the possibility to avoid the above-described undersupplied operating states of an automatic transmission, and to be able to operate an automatic transmission at as high an efficiency as possible by way of delivery volumes which are adapted in each case to the currently prevailing hydraulic fluid volume requirement.

DE 10 2014 207 798 A1 has disclosed a transmission which is configured with a variable capacity pump. Besides the variable capacity pump, the transmission includes a further hydraulic pump which is configured as a constant-capacity pump. During operation of a transmission, a hydraulic fluid volume flow which is to be fed to the transmission components is determined, and the delivery capacity of the hydraulic pumps is set in a manner adapted to the level of the hydraulic fluid volume flow. The hydraulic fluid volume flow, which is provided by the hydraulic pumps for supplying the transmission components, is divided between the transmission components in a manner dependent on the operating state, such that the variable delivery capacity of the hydraulic pump can be set in each case to a minimum in order to implement operation which is as optimized as possible in terms of efficiency.

The variable capacity pump is the main transmission pump which is coupled to a transmission input shaft and can therefore be driven by a drive machine connectable to the transmission input shaft of the transmission. In contrast to this, the second pump unit is coupled to the transmission output shaft which in turn is connectable to an output of a vehicle drive train which is configured with the transmission, and is drivable at an input speed which is equivalent to the output speed. A pressure side of the variable capacity pump is connected to a primary pressure circuit in which the system pressure prevails, the system pressure in turn can be set via a pilot controllable system pressure valve. A pilot controllable valve device, known as a cooling valve, is provided downstream of the system pressure valve.

In addition, the cooling valve is assigned a thermal bypass valve, which is configured with a temperature probe, in order for it to be possible for a hydraulic fluid volume flow guided via a cooler to be set to the desired extent in a manner dependent on a currently prevailing operating temperature.

SUMMARY OF THE INVENTION

In example embodiments, the present invention provides a method for operating a transmission with a hydraulic system which includes a variable capacity hydraulic pump, by which method the operation of a transmission can be further optimized.

In the case of the method according to example aspects of the invention for operating a transmission with a hydraulic system which includes a variable capacity hydraulic pump, in each case a current hydraulic fluid volume requirement for actuating the transmission and for temperature controlling and lubricating components of the transmission is determined during operation, and the delivery volume of the hydraulic pump is set in a manner dependent on the currently determined hydraulic fluid volume requirement of the transmission. It is possible for that delivery volume of the hydraulic pump, which is provided for temperature controlling and lubricating the components, to be guided at least partially through a heat exchanger.

According to example aspects of the invention, the delivery volume of the hydraulic pump is varied in a manner dependent on a temperature of the hydraulic fluid, to an extent which sets that part of the delivery volume flow of the hydraulic pump which is to be guided via the heat exchanger.

The procedure according to the invention is based on the knowledge that, for example during operation of an automatic transmission in a manner optimized in terms of efficiency, during which a hydraulic fluid volume requirement is requested merely by the transmission actuation or the transmission actuator system and, at the same time, a hydraulic fluid volume requirement for cooling and/or lubricating different transmission components of an automatic transmission is low or even equal to zero, an exchange of thermal energy between the hydraulic fluid of the automatic transmission and a temperature control medium of the heat exchanger is low. During operating state progressions of this type of an automatic transmission, there is then the possibility that the hydraulic fluid volume of the automatic transmission reaches impermissibly high temperatures which cause irreversible impairments of the functionality of different transmission components and/or electric components of the automatic transmission, which is undesirable, however.

Moreover, there is also the possibility that, during operation of this type of an automatic transmission in a manner optimized in terms of efficiency, in particular at low ambient temperatures and after a restart of a vehicle, a desired operating temperature of the automatic transmission, and therefore also of the hydraulic fluid, is reached only after undesirably long operating times have passed, and driving comfort cannot be achieved to an expected extent for a relatively long time as a result, since, during operation which is optimized in terms of efficiency, the hydraulic fluid volume cannot then be brought by way of the supply of thermal energy of the heat exchanger to the required extent within short operating times to the operating temperature which aids driving comfort.

Via the method according to the invention, disadvantageous operating state progressions of this type are avoidable in a simple way by setting, in a manner adapted to the respectively currently prevailing hydraulic fluid temperature, of the hydraulic fluid volume flow which is conveyed by the hydraulic pump and the resulting hydraulic fluid volume flow which flows through the heat exchanger, or are changeable within short operating times in such a way that thermally induced transmission damage does not occur and high driving comfort is achieved.

In one advantageous variant of the method according to the invention, the delivery volume flow of the hydraulic pump is varied in a manner dependent on a current heat output of the heat exchanger, that is to say in each case in a manner dependent on the heat or cooling output of the heat exchanger. If a high heat output of the heat exchanger prevails, there is therefore the possibility, with low complexity, to raise the delivery volume of the hydraulic pump to a relatively small extent and, as a result, to be able to operate the transmission with a higher efficiency than is the case at low available heat outputs of the heat exchanger.

In one variant of the method according to the invention which can be carried out in a particularly simple manner, the delivery volume flow of the hydraulic pump is raised if a temperature threshold is exceeded in order for it to be possible to avoid overheating operating states of the transmission.

If the delivery volume flow of the hydraulic pump is set in a manner dependent on a plurality of temperature thresholds, the delivery volume flow of the hydraulic pump being raised in each case if said temperature thresholds are exceeded, there is once again the possibility in a simple way, despite elevated operating temperatures, for the efficiency of the transmission above the operating temperature to be impaired to as low an extent as possible in each case.

In a further variant of the method according to the invention, the increase in the delivery volume flow of the hydraulic pump which is requested in each case if the temperature thresholds are exceeded is determined in each case via a model which maps the heat output of the heat exchanger, whereby oversupply operating states of the transmission which impair an efficiency of the transmission are avoidable in a manner dependent on the operating point.

Desired operating states of the transmission are achievable with low computing effort if the increase in the delivery volume flow of the hydraulic pump, which is requested in each case if the temperature thresholds are exceeded, is defined in each case by a characteristic diagram, from which the heat output of the heat exchanger which is available in a manner dependent on the operating state in each case can be determined.

If the delivery volume flow of the hydraulic pump is varied in a manner dependent on a thermal energy which the hydraulic fluid exchanges with the transmission and the heat exchanger during operation, and which thermal energy is determined predictively for a defined time period by models which map the transmission and the heat exchanger, in a manner dependent on a current operating state profile of the transmission and the heat exchanger, what is known as a prophylaxis function is available, via which current power inputs can be taken into consideration during the temperature control of the hydraulic fluid volume of a transmission.

Through said procedure, for example, a heating operation of the hydraulic fluid volume which is present in the oil sump of the transmission can be delayed in the case of high thermal energy inputs into the hydraulic fluid volume, whereby, for example, a plurality of successively performable full load starts, or what are known as racing starts, are possible.

In addition, there is also the possibility via the above-described procedure to control a heating operation of the transmission or the hydraulic fluid volume up to a certain degree, in order to achieve, for example, operating points at which the transmission is operable with an optimum efficiency within short operating times.

In general, the procedure according to the invention achieves a situation where temperature control of the hydraulic fluid of a transmission can be carried out to a desired extent during energy-optimized operating states, overheating operating states of a transmission is avoidable, and the hydraulic fluid temperature can be brought within short operating times to an operating temperature at which the transmission is operable with a high efficiency.

Here, for example, in order to protect the oil sump against overheating, what is known as a cooler cooling oil requirement or a hydraulic fluid volume flow, which is to be guided through the heat exchanger by the vane cell pump, is set in a manner dependent on the transmission oil temperature, which makes it possible for the necessary cooling output of the cooling system to be utilized for the transmission cooling.

Furthermore, it can be provided that the cooler model or the model which depicts the operating state of the heat exchanger switches over to minimum cooling oil volume flow requirements if parameterizable transmission oil temperature limits are exceeded.

Both the features specified in the patent claims and the features specified in the following exemplary embodiment of the method for operating a transmission with a hydraulic system according to the invention are suitable, in each case individually or in any desired combination with one another, for refining the subject matter according to the invention.

Further advantages and advantageous embodiments of the method for operating a transmission with a hydraulic system according to the invention will emerge from the patent claims and from the exemplary embodiment which is described in principle below with reference to the drawing.

BRIEF DESCRIPTION OF THE DRAWING

The invention is described more specifically by example on the basis of the attached figures. In the figures, the following is shown.

DETAILED DESCRIPTION

Figure 1:
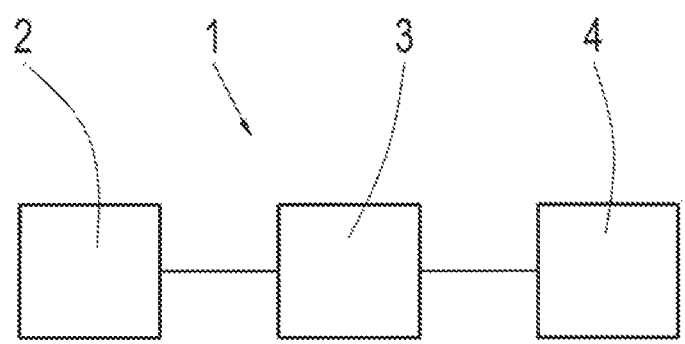
FIG. 1 of the drawings shows a schematic illustration of a vehicle drive train with a drive machine, an output, and a transmission arranged in the power flow of the vehicle drive train between the drive machine and the output.

Reference will now be made to embodiments of the invention, one or more examples of which are shown in the drawing. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
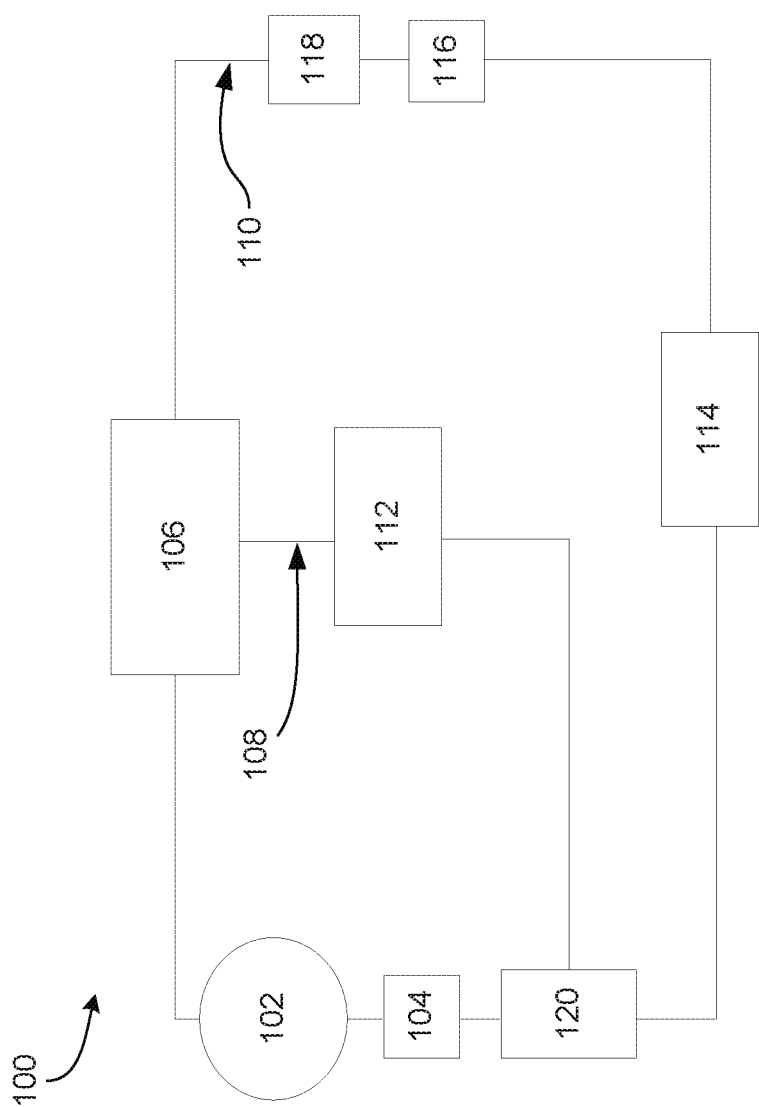
FIG. 2 of the drawings shows a schematic illustration of a hydraulic system the transmission.

FIG. 1 shows a schematic illustration of a vehicle drive train 1 with a drive machine 2, a transmission 3 configured as a double clutch transmission, and an output 4, the transmission 3 being operatively connected on the input side to the drive machine 2 and on the output side to the output 4. The transmission 3 is configured with an electrohydraulic transmission system or a hydraulic system 100, shown in FIG. 2, which includes a pressure medium source which is configured in the present case as a hydraulic pump 102 which is adjustable and controllable in an active manner. The variable capacity hydraulic pump 102 is, in the present case, a vane cell pump which is adjustable and controllable, a variable delivery volume or a variable delivery volume flow can be made available via such vane cell pump 102, it also possible for other suitable designs of controllable variable capacity pumps to be provided. The delivery volume of the hydraulic pump 102 can be set actively via a valve device 104 or an electrohydraulic pressure regulator, also called an electromagnetic pressure regulator.

In addition to the valve device 104, the electrohydraulic transmission control system 100 also includes a system pressure valve 106, by which a system pressure can be set in a pressure circuit, configured as a primary pressure circuit 108, of the electrohydraulic transmission control system 100, the primary pressure circuit 108 is supplied with higher priority via the system pressure valve 106 with hydraulic fluid provided by the hydraulic pump 102 than a secondary pressure circuit 110 which is likewise arranged downstream of the system pressure valve 106. Different consumers of the transmission 3 are supplied with hydraulic fluid both via the primary pressure circuit 108 and via the secondary pressure circuit 110, shifting elements 112, inter alia, of a double clutch system of the transmission 3 being loaded with actuating pressure via the primary pressure circuit 108, whereas a cooling and lubricating oil system 114 of the transmission 3 is supplied via the secondary pressure circuit 110 of the electrohydraulic transmission control system 100. In the present case, the hydraulic pump 102 is driven directly by the drive machine 2 via an input shaft of the transmission 3, whereby the input speed of the hydraulic pump 102 is substantially identical to the speed of the drive machine 2. In a manner dependent on the respectively prevailing application, there is also the possibility that a transmission with a defined transmission ratio is provided between the transmission input shaft and the hydraulic pump 102, the speed of the drive machine 2 is transformed in each case to a higher or lower speed level via the transmission.

A pilot controllable cooling valve 116 of the secondary pressure circuit 110 is provided downstream of the system pressure valve 106, the system pressure valve 106 can be brought into an operative connection with regions of the transmission 3 via the cooling valve 116 in order to load said regions with hydraulic fluid. Here, a heat exchanger 118 is provided in the present case between the system pressure valve 106 and the cooling valve 116 to conduct the hydraulic fluid volume starting from the system pressure valve 106 in the direction of the cooling valve 116.

Figure 3:
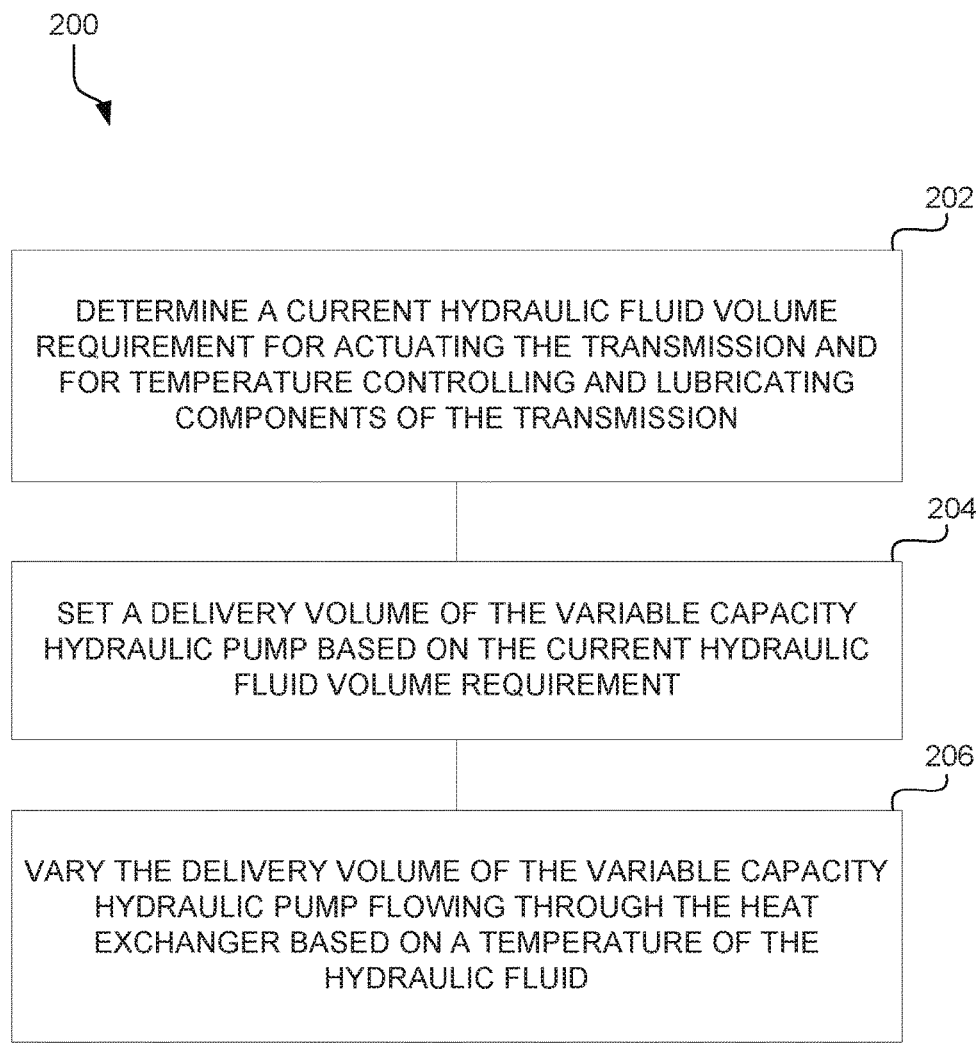
FIG. 3 of the drawings shows a flow diagram of one embodiment of a method for operating a transmission with a hydraulic system in accordance with aspects of the present matter.

In order for it to be possible to operate the transmission 3 with as satisfactory an efficiency as possible, a method 200 is provided as shown in FIG. 3 in which a current hydraulic fluid volume requirement for actuating the transmission 3 and for temperature controlling and lubricating components of the transmission 3 is determined in each case during operation of the transmission 3 at step 202, and the delivery volume of the hydraulic pump 102 is set in a manner dependent on the currently determined hydraulic fluid volume requirement at step 204. Here, that delivery volume of the hydraulic pump 102 which is provided for temperature controlling and lubricating the components of the transmission 3 is first guided through the heat exchanger 118 and is subsequently forwarded in the direction of the components of the transmission 3 which are to be temperature controlled and lubricated.

Here, in each case at least the hydraulic fluid volume requirement which is required for actuating the transmission actuator system 112 is provided by the hydraulic pump 102, the transmission actuator system 112 is supplied with hydraulic fluid starting from the hydraulic pump 102 via the primary pressure circuit 108.

During defined operating states of the transmission 3, during which no appreciable hydraulic fluid volume flow is requested by the secondary pressure circuit 110, at step 206, the delivery volume flow of the hydraulic pump 102 is reducible to an extent which increases the efficiency of the transmission 3. During an operating state of this type of the transmission 3, no hydraulic fluid volume flow or only a low hydraulic fluid volume flow is introduced into the secondary pressure circuit 110 and is guided through the heat exchanger 118. As a result, thermal energy can neither be fed to the hydraulic fluid near the heat exchanger 118 nor can be output from the hydraulic fluid to a temperature control medium which is likewise guided through the heat exchanger 118. There is the possibility here to configure the heat exchanger 118 as a parallel-flow, counter-flow or cross-flow heat exchanger, where air, water, oil or another suitable fluid state temperature control medium is used as temperature control medium. In the present case, the heat exchanger 118 is part of a vehicle's own cooling system and provides a defined heat output in a manner dependent on the respectively prevailing operating point. This means that the hydraulic fluid of the transmission 3 can either be heated or cooled by the heat exchanger 118.

During operating state progressions of the transmission 3, during which the hydraulic fluid is heated greatly by the transmission and, at the same time, the transmission is operated in an operating state which is optimized in terms of efficiency, during which only a low hydraulic fluid volume flow is guided through the heat exchanger 118, the temperature of the hydraulic fluid possibly rises. This is the case, for example, when, during operation of this type of the transmission 3, only a low hydraulic fluid volume requirement is requested by the secondary pressure circuit 110.

In order to avoid impermissibly high temperatures of the hydraulic fluid in the oil sump 120 of the transmission 3, at step 206, the delivery volume flow of the hydraulic pump 102 is raised, if an operating temperature limit of the hydraulic fluid in the oil sump 120 is exceeded, to such an extent that the heat output which is currently available by the heat exchanger 118 is sufficient to prevent overheating operating states of the transmission 3 or impermissibly high operating temperatures of the hydraulic fluid of the transmission 3, and to temperature control or cool the hydraulic fluid by the heat exchanger 118 accordingly.

Depending on the respectively prevailing application, there is the possibility to successively raise the delivery volume flow in a manner dependent on a plurality of temperature thresholds of the operating temperature of the hydraulic fluid, and thus to impair the efficiency of the transmission 3 to as small an extent as possible in a manner dependent on the respectively prevailing operating temperature of the hydraulic fluid and on the operating state.

LIST OF DESIGNATIONS

1 Vehicle drive train
2 Drive machine
3 Transmission
4 Output

The invention claimed is:

1. A method for operating a transmission (3) with a hydraulic system comprising a variable capacity hydraulic pump, the method comprising:
during operation of the transmission (3), determining a current hydraulic fluid volume requirement for actuating the transmission (3) and for temperature controlling and lubricating components of the transmission (3);
setting a delivery volume of the variable capacity hydraulic pump in a manner dependent on the current hydraulic fluid volume requirement of the transmission (3) such that no appreciable portion of the delivery volume of the variable capacity hydraulic pump is provided through a heat exchanger for temperature controlling and lubricating the components; and
varying the delivery volume of the variable capacity hydraulic pump flowable through the heat exchanger in a manner dependent on a temperature of a hydraulic fluid such that at least a portion of the delivery volume of the variable capacity hydraulic pump is provided through the heat exchanger for temperature controlling and lubricating the components.

2. The method as claimed in claim 1, wherein the delivery volume of the variable capacity hydraulic pump is varied in a manner dependent on a current heat output of the heat exchanger.

3. The method as claimed in claim 1, further comprising raising the delivery volume of the hydraulic pump when a temperature threshold is exceeded.

4. The method as claimed in claim 1, further comprising setting the delivery volume of the hydraulic pump in a manner dependent on a plurality of temperature thresholds such that the delivery volume of the hydraulic pump increases when each of the plurality of temperature thresholds is exceeded.

5. The method as claimed in claim 4, wherein the increase in the delivery volume of the hydraulic pump, which is requested when each of the plurality of temperature thresholds is exceeded, is determined in each case with a model which maps a heat output of the heat exchanger.

6. The method as claimed in claim 4, wherein the increase in the delivery volume of the hydraulic pump, which is requested when each of the plurality of temperature thresholds is exceeded, is defined in each case by a characteristic diagram from which a respective heat output of the heat exchanger is determinable in a manner dependent on an operating state of the transmission (3).

7. The method as claimed in claim 1, wherein the delivery volume of the hydraulic pump is varied in a manner dependent on a thermal energy which the hydraulic fluid exchanges with the transmission (3) and the heat exchanger during operation of the transmission (3), the thermal energy determined predictively for a defined time period by models which map the transmission (3) and the heat exchanger in a manner dependent on a current operating state profile of the transmission (3) and the heat exchanger.

* * * * *